United States Patent
Handke et al.

(10) Patent No.: US 6,905,006 B2
(45) Date of Patent: Jun. 14, 2005

(54) RETAINING CAP FOR A PROTECTIVE BELLOWS

(75) Inventors: Günther Handke, Euerbach (DE); Stephan Zuber, Schonungen (DE)

(73) Assignee: ZF Sachs AG, Schweinfurt (DE)

( * ) Notice: Subject to any disclaimer, the term of this patent is extended or adjusted under 35 U.S.C. 154(b) by 12 days.

(21) Appl. No.: 10/705,071

(22) Filed: Nov. 10, 2003

(65) Prior Publication Data

US 2004/0168871 A1 Sep. 2, 2004

(30) Foreign Application Priority Data

Nov. 15, 2002 (DE) .......................................... 102 53 221

(51) Int. Cl.[7] .................................................. F16F 9/38
(52) U.S. Cl. .............................. 188/322.12; 267/64.21; 267/64.24
(58) Field of Search ................. 188/322.12; 267/64.11, 267/64.15, 64.16, 64.17, 64.19, 64.21, 64.24, 64.27, 35, 219, 220; 280/124.145, 124.146, 124.147, 124.154, 124.155

(56) References Cited

U.S. PATENT DOCUMENTS 5,402,868 A * 4/1995 Handke et al. ........ 188/322.12
5,636,831 A * 6/1997 Gubitz .................... 267/64.24
6,199,844 B1    3/2001 McCormick et al.

FOREIGN PATENT DOCUMENTS

| DE | 1 968 945 | 10/1969 |
|---|---|---|
| DE | G 91 09 020 | 11/1991 |
| DE | G 91 09 019.9 | 11/1991 |
| DE | 41 37 447 | 5/1992 |
| DE | 196 41 728 | 4/1998 |

* cited by examiner

Primary Examiner—Pam Rodriguez
(74) Attorney, Agent, or Firm—Cohen, Pontani, Lieberman & Pavane

(57) ABSTRACT

A retaining cap includes a sleeve-shaped basic body which has at least one protective bellows retaining segment on which a protective bellows can be supported. A component which is movable with respect to the retaining cap can penetrate into the installation space of the retaining cap, the retaining cap having a plurality of deformation regions which are arranged in the circumferential direction. When in contact with the movable component, these regions make possible a free passage for the movable component.

7 Claims, 4 Drawing Sheets

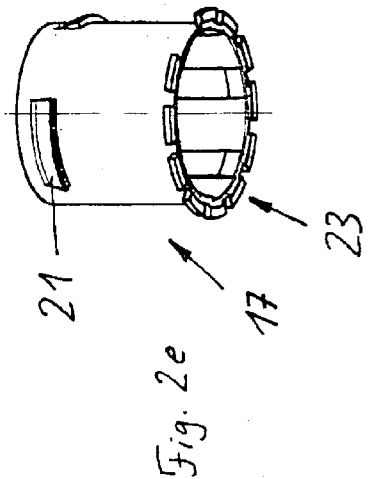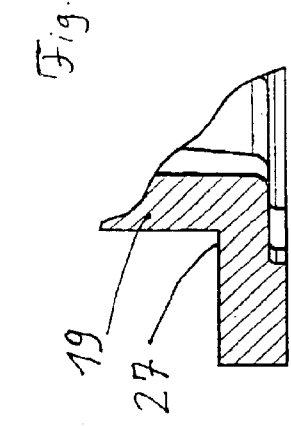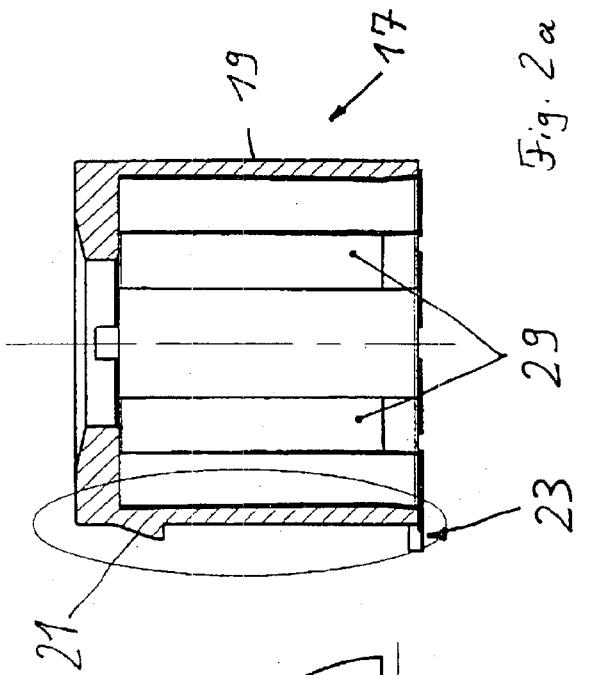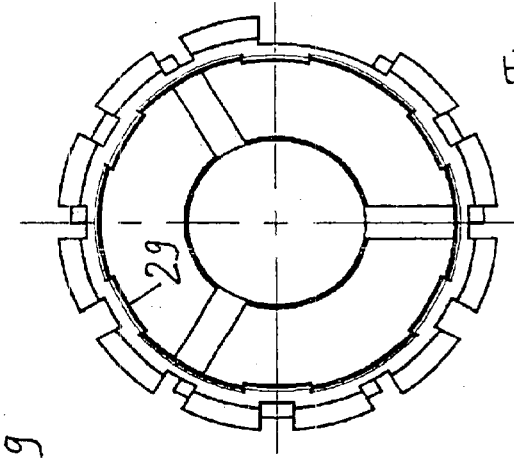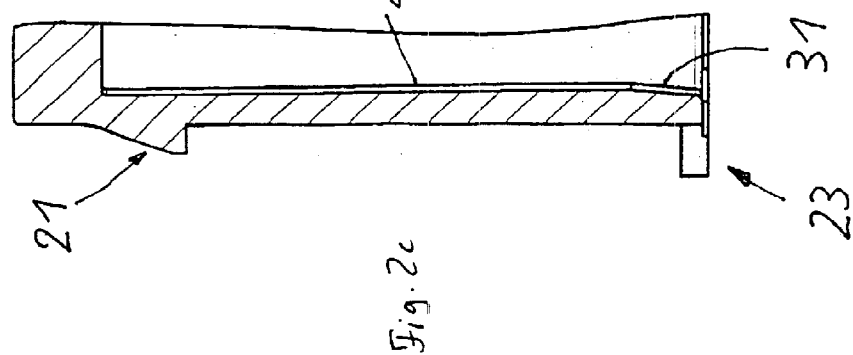

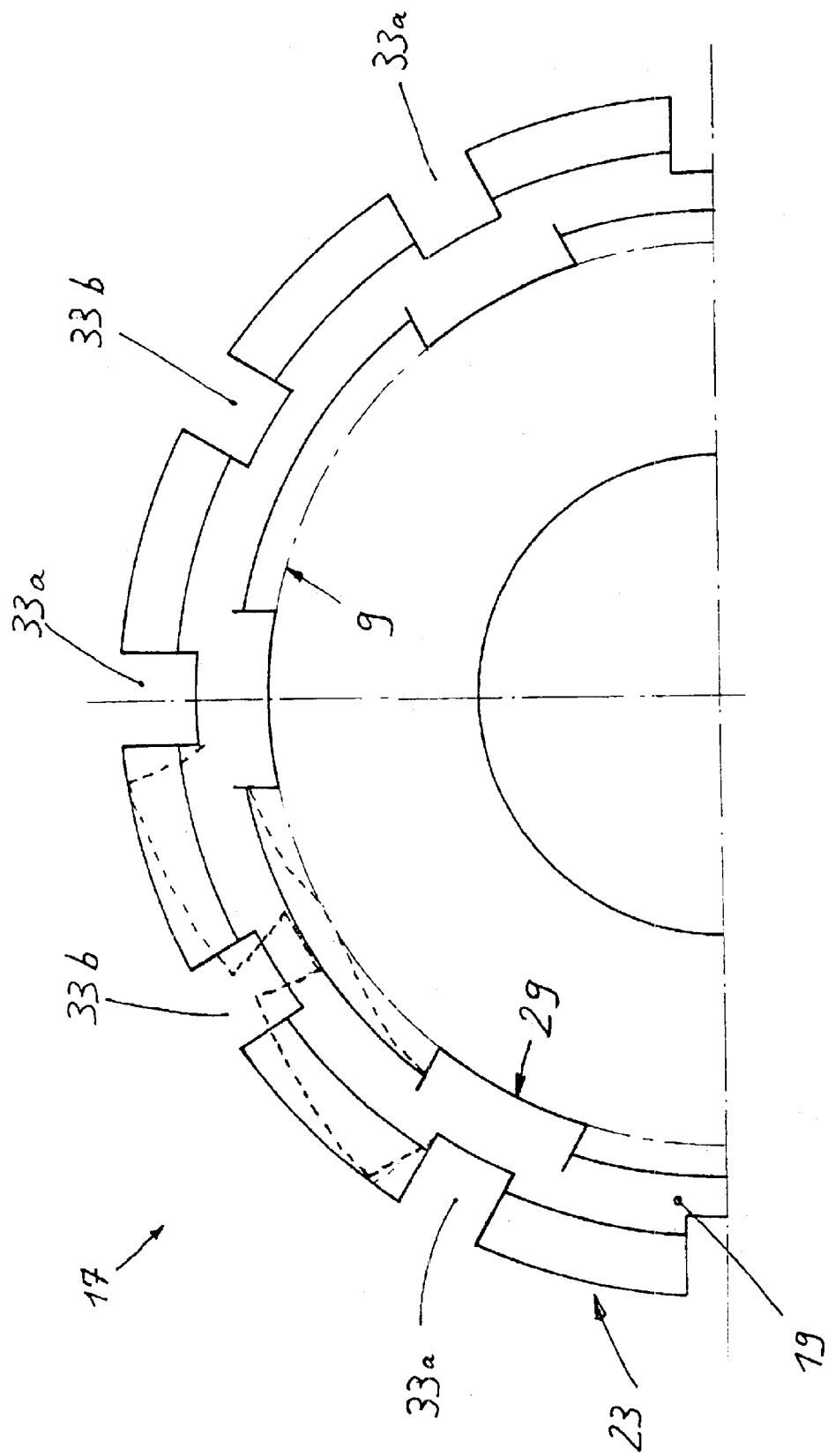

RETAINING CAP FOR A PROTECTIVE BELLOWS

BACKGROUND OF THE INVENTION

1. Field of the Invention

The invention relates to a retaining cap for a protective bellows, of the type having at least one retaining segment on which the bellows can be supported.

2. Description of the Related Art

G 91 09 020 U1 discloses a retaining cap for a vibration damper, which has a sleeve section with radially extending protective bellows retaining segments. The protective bellows retaining segments serve as a stop for a protective bellows which covers at least one section of a piston rod of the piston/cylinder assembly. A similar retaining cap is also described, for example, in DE 41 37 447 A1.

An identical vehicle spring is frequently used for different vehicles of a manufacturer, and so, under some circumstances, the vehicle spring has to be combined with a vibration damper of larger dimensions to form a spring strut, in which case the vehicle spring envelopes the vibration damper. If tolerance zones of the vehicle spring and the vibration damper which are still unfavorable are then combined, it cannot be absolutely ruled out that, when installed, the vehicle spring will come into contact with the retaining cap, in particular in the region of the protective bellows retaining segments.

To solve this problem, the configuration according to FIG. 10 of DE 196 41 728 A1, for example, has been taken into consideration. In this variant of a retaining cap, the protective bellows engages with radial segments in the retaining cap, i.e. the protective bellows determines the maximum diameter in the critical region with respect to the vehicle spring. However, this solution involves the drawback of the protective bellows having to be fitted in a manner oriented with respect to the retaining cap.

A solution according to DE 19 88 945 U has also been taken into consideration, which describes a retaining cap which is supported on a neck of the spring plate above the end surface of the vibration damper. However, this variant requires a special spring plate and a retaining cap which provides only a very small impact surface for a stop buffer.

SUMMARY OF THE INVENTION

The object of the present invention is to realize a retaining cap for a piston/cylinder assembly which can be used universally with respect to installation spaces which are small in diameter.

According to the invention, the object is achieved by the retaining cap having a plurality of deformation regions which are arranged in the circumferential direction and, when in contact with the movable component, make possible a free passage for the movable component.

The arrangement of a plurality of deformation regions in the circumferential direction enables the retaining cap to be fitted without being specially aligned in the circumferential direction. If contact between the axial movable element and the retaining cap should occur, then a deformation region will also be present at this point of contact.

Provision can thus be made for the sleeve-shaped basic body to have, on its inner wall, clamping ribs which run axially and cause the basic body to be at a distance from the component carrying the retaining cap, the protective bellows retaining segments being divided in the circumferential direction in such a manner that a recess is formed between the protective bellows retaining segments in the region of the clamping ribs. The special alignment of the recesses with respect to the clamping ribs provides, on the one hand, a solid configuration of the clamping ribs and protective bellows retaining segments, but also sufficient elasticity of the retaining cap for the deformation regions.

In addition, when the need arises, in addition to the recesses between the protective bellows retaining segments in the region of the clamping ribs, further recesses are provided in the circumferential region between the clamping ribs.

Furthermore, one embodiment provides the possibility for the deformation regions to comprise a predetermined breaking point which, when in contact with the movable component, allows a subregion of the retaining cap to be severed. In the case of a piston/cylinder assembly in the constructional form of a vibration damper with a vehicle spring, it is already established during the installation of both subassemblies whether there is a critical installation state for the vehicle spring with respect to the vibration damper. If a subregion of the cap is severed in this case by the vehicle spring, then there is no installation problem in respect of the further operation of the entire subassembly of vibration damper/vehicle spring.

In a further advantageous configuration, the deformation regions are formed at the transition from the at least one protective bellows retaining segment to the sleeve-shaped basic body. These deformation regions constitute the largest diameter and therefore also the critical installation region.

As an alternative, the predetermined breaking points may also be formed within the sleeve-shaped basic body.

The part which can be severed at the predetermined breaking point can thus comprise a section of the protective bellows retaining segment and a cutout from the basic body. A particularly large clearance for the axially movable component can therefore be achieved.

It may be entirely expedient if the retaining cap is assigned a spatially separated end cap. In the case of a piston/cylinder assembly, the end cap can be used, for example, for a stop and therefore has to absorb significantly greater forces. It is frequently produced from a metallic material. Significantly lower requirements have to be met for the retaining function of a protective bellows, and so use can also be made of a plastic which can be dimensioned more easily with respect to possible deformation regions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 2A–2E show an end cap in detail; and

FIG. 3 shows an end cap with an illustration of the deformation.

DETAILED DESCRIPTION OF THE PRESENTLY PREFERRED EMBODIMENTS

Figure 1A:
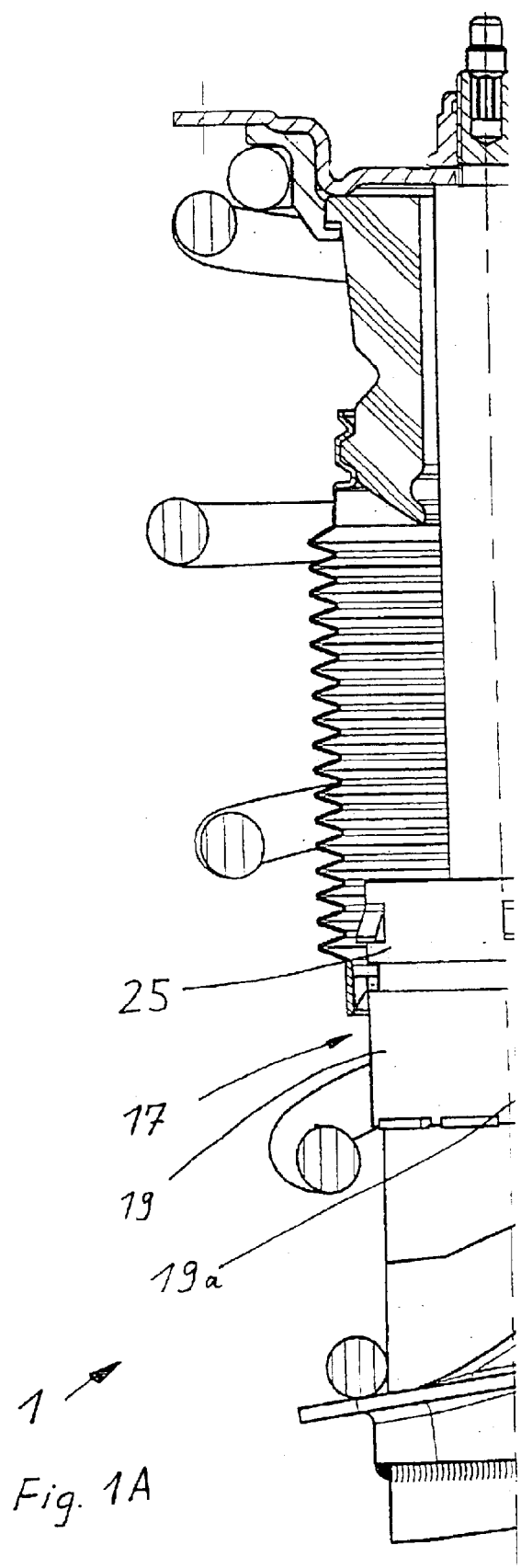
FIG. 1A is a partial axial view which shows a piston/cylinder assembly in the structural form of a spring strut with the retaining cap according to the invention.
Figure 1B:
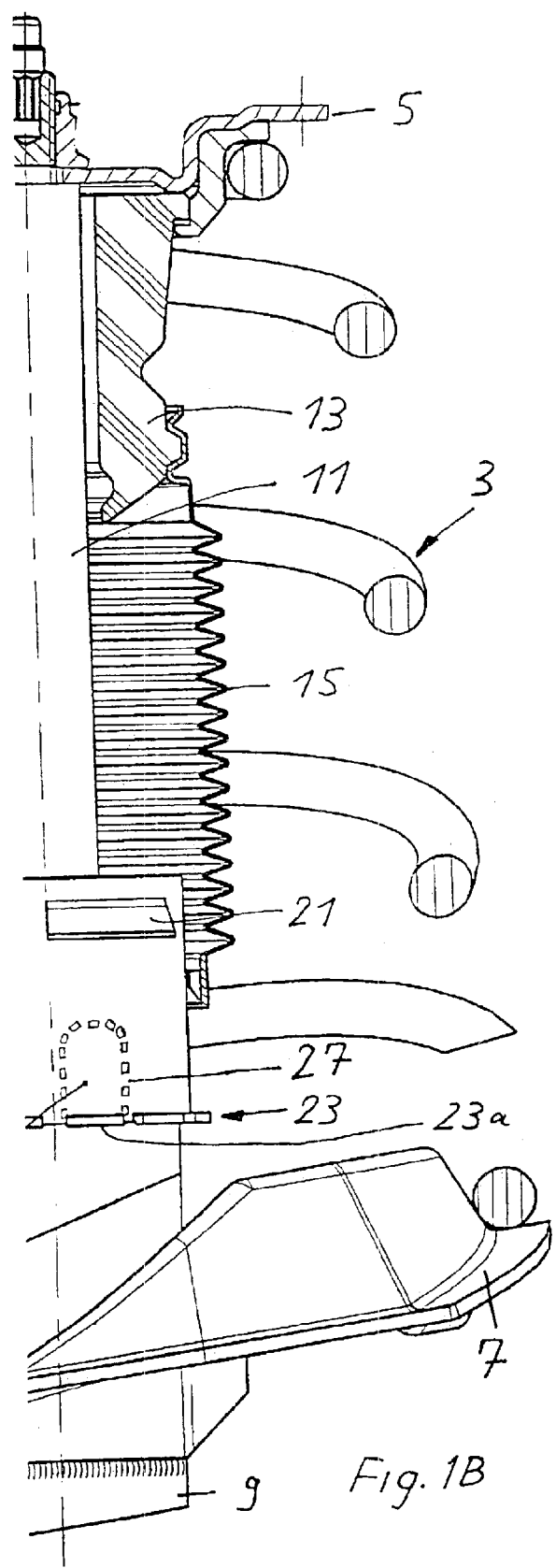
FIG. 1B is a partial axial view of an alternative embodiment having a retaining cap with a predetermined breaking point.

FIGS. 1A and 1B show a piston/cylinder assembly in the structural form of a vibration damper 1 in conjunction with a vehicle spring 3 which envelopes the vibration damper between an upper and a lower spring plate 5; 7. In this case, the vehicle spring is arranged obliquely with respect to the longitudinal axis of the vibration damper, in which case the end turns may, under some circumstances, have a smaller diameter than the central turns of the vehicle spring. An axially movable piston rod 11 which is covered by a stop buffer 13 and a protective bellows 15 is arranged within a container 9 carrying the lower spring plate 7. A lower end of the protective bellows 15 is supported in the axial direction on a retaining cap 17 by means of a sleeve-shaped basic body 19 which has radially extending protective bellows retaining segments. For the protective bellows, protective bellows retaining segments 21; 23 are provided in the tension and compression directions, the lower end of the protective bellows being able to move freely axially between the two spaced apart rows of the protective bellows retaining elements and not being subject to any changes in length.

FIG. 1A shows an end cap 25, which also has the protective bellows retaining segments 21 for the tension direction, arranged spatially separated from the basic body 19. In particular in conjunction with a heavily loaded stop buffer 13, the end cap 25 may consist of a metallic material and the retaining cap, for example, of a plastic.

When the vehicle spring is installed, the effect achieved, in particular, by the oblique position of the vehicle spring or its end turns with a smaller diameter in conjunction with unfavorable manufacturing tolerances may be that, for example, the vehicle spring can penetrate as a component which is axially movable with respect to the vibration damper into the installation space of the retaining cap. So that the vehicle spring can be fitted in spite of this, the retaining cap has deformation regions which extend in the circumferential direction and make possible a free passage for the axially movable component, in this case the vehicle spring.

In one embodiment, the deformation region comprises a predetermined breaking point 27. In FIG. 1B, the predetermined breaking point is formed within the sleeve-shaped basic body in the form of a perforation. The predetermined breaking point is aligned with respect to a protective bellows retaining segment, so that the predetermined breaking point releases a severable part 23a of a protective bellows retaining segment 23 and a cutout 19a from the sleeve-shaped basic body of the retaining cap as soon as contact occurs between the vehicle spring 3 and the retaining cap 17.

In the group of FIGS. 2A to 2E, the retaining cap 17 is illustrated in the structural form of an end cap. In the sectional illustration according to FIG. 2A, the sleeve-shaped basic body 19 can be seen together with the two spaced apart configurations of the protective bellows retaining segments 21; 23. It can be seen that the diameter of the protective bellows retaining segments 23 in the compression direction of the protective bellows 15 is larger than the diameter of the segments 21 in the tension direction, With the result that the problem which has been discussed of the possible contact with the vehicle spring 3 is greater for the lower protective bellows retaining segment 23.

Clamping ribs 29 which run axially and are supported radially on the container of the vibration damper are formed on the inner wall of the sleeve-shaped basic body 19. Reference is additionally made to the view according to FIG. 2B. FIG. 2C shows that the clamping ribs 29 do not enter into any contact with the container in the region of the protective bellows retaining segments 23, since an installation bevel 31 has been provided.

FIG. 2D is an enlargement of a detail in the region of one of the protective bellows retaining segments 23 for the compression direction. The deformation region, which can also constitute a predetermined breaking point 27, is formed at the transition of the protective bellows retaining segment 23 to the sleeve-shaped basic body 19. If a protective bellows retaining segment breaks off, the clamping force of the sleeve-shaped basic body is not affected by it since, as already described above, there is the installation bevel and therefore clamping forces cannot be transmitted at this point.

FIG. 2E is intended to clarify the state when a protective bellows retaining segment 23 has been severed because of contact with the axially movable component, i.e., for example, the vehicle spring 3. The other protective bellows retaining segments are configured in such a manner that the retaining function is readily met. It is essential for the retaining cap 17 to be able to be installed without particular measures for orienting the retaining cap with respect to the axially movable component by arrangement of deformation regions in the circumferential direction. Ultimately, the axially movable component, by means of the specific and intentional damage to the retaining cap, ensures that the installation space is shared by the retaining cap and the axially movable component.

FIG. 3 shows a detail from FIG. 2B in order to clarify the deformation behavior of the retaining cap 17. As already described, the sleeve-shaped basic body 19 of the retaining cap has clamping ribs 29 which run axially and cause the basic body to be at a distance from the carrying component, namely the container, the protective bellows retaining segments being divided by recesses 33a in such a manner that an outer recess 33a is formed on the basic body in the region of the inside clamping ribs between the protective bellows retaining segments 23. In addition, recesses 33b are provided in the circumferential region between the clamping ribs. Both measures result in it being possible for the protective bellows retaining segments 23 to be radially deformed, as illustrated by the dashed line guide. In this variant of the invention too, the effect achieved by the deformation regions, which are distributed in the circumferential direction, in the form of the recesses 33a; 33b is a free passage for the vehicle spring with respect to the retaining cap irrespective of an oriented installation position of the retaining cap to the vehicle spring.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A retaining cap for a protective bellows, said retaining cap comprising
    a sleeve-shaped basic body having a central axis, an inner wall with a plurality of clamping ribs extending in an axial direction, which ribs can contact a component carrying the retaining cap, and an outer wall with a plurality of retaining segments which can support said bellows, said retaining segments being separated circumferentially by recesses comprising first recesses which are radially aligned with respective said clamping ribs, and
    a plurality of deformation regions formed circumferentially on said basic body between said first recesses, which deformation regions, when contacted by a movable component, can deform radially inward to allow free passage of the movable component.

2. A retaining cap as in claim 1 wherein said recesses further comprise second recesses provided between said first recesses.

3. A retaining cap as in claim 1 wherein said deformation regions each comprise a predetermined breaking point which allows a portion of said cap to be severed when contacted by said movable component.

4. A retaining cap as in claim 3 wherein the deformation regions are formed at a transition between the basic body and the retaining segments.

5. A retaining cap as in claim 3 wherein said deformation regions are formed within the sleeve-shaped basic body.

6. A retaining cap as in claim 5 wherein each said portion of said cap which can be severed comprises a cutout of the basic body and at least part of one of said retaining segments.

7. A retaining cap as in claim 1 wherein said retaining cap further comprises an end cap which is spatially separated from said sleeve-shaped basic body.

* * * * *